United States Patent
Stephens et al.

(10) Patent No.: US 9,680,187 B2
(45) Date of Patent: Jun. 13, 2017

(54) BATTERY REMOVAL APPARATUS

(71) Applicant: Apple Inc., Cupertino, CA (US)

(72) Inventors: Gregory N. Stephens, Sunnyvale, CA (US); David A. Pakula, San Francisco, CA (US); Ashutosh Y. Shukla, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 679 days.

(21) Appl. No.: 13/903,867

(22) Filed: May 28, 2013

(65) Prior Publication Data

US 2014/0355207 A1    Dec. 4, 2014

(51) Int. Cl.
*H01M 10/42* (2006.01)
*G06F 1/16* (2006.01)
*H01M 2/10* (2006.01)

(52) U.S. Cl.
CPC ........ *H01M 10/425* (2013.01); *G06F 1/1635* (2013.01); *H01M 2/1066* (2013.01); *Y10T 156/1994* (2015.01)

(58) Field of Classification Search
None
See application file for complete search history.

(56) References Cited

U.S. PATENT DOCUMENTS

| 8,296,925 B2 | 10/2012 | Myers et al. | |
| 2008/0290208 A1* | 11/2008 | Anderson | B65H 18/103 242/522 |
| 2009/0274953 A1* | 11/2009 | Myers | H01M 2/1066 429/100 |
| 2011/0223447 A1 | 9/2011 | Ignor et al. | |

OTHER PUBLICATIONS

Weekly Mod. "How to replace an iPhone 4 battery." (http://www.imore.com/tipb-weekly-mod-replace-battery-iphone-4). (Dec. 6, 2011).
dhgate.com. "Original battery pull tab with adhesives stocler fpr o{jpme 4 4g." (http://www.dhgate.com/store/product/original-battery-pull-tab-with-adhesives/14396310-142873327.html). (May 28, 2013).

* cited by examiner

*Primary Examiner* — Barbara Gilliam
*Assistant Examiner* — Adam A Arciero
(74) *Attorney, Agent, or Firm* — Kilpatrick Townsend & Stockton, LLP

(57) ABSTRACT

This application relates generally to battery removal apparatuses. For example, one battery removal apparatus disclosed herein comprises a pull tab configured to be disposed between a battery and a casing of a portable computing device. The pull tab is shaped such that at least one area of the battery and the casing are exposed to one another when the battery, the pull tab and the casing are compressed together. An adhesive layer is shaped to cover the at least one exposed area such that the battery adheres to the casing, and the pull tab is reinforced so as to prevent the pull tab from tearing when used to remove the battery from the portable computing device. Other battery removal apparatuses include a pull string battery removal apparatus as well as a battery removal apparatus that incorporates both a pull tab and one or more pull strings.

8 Claims, 15 Drawing Sheets

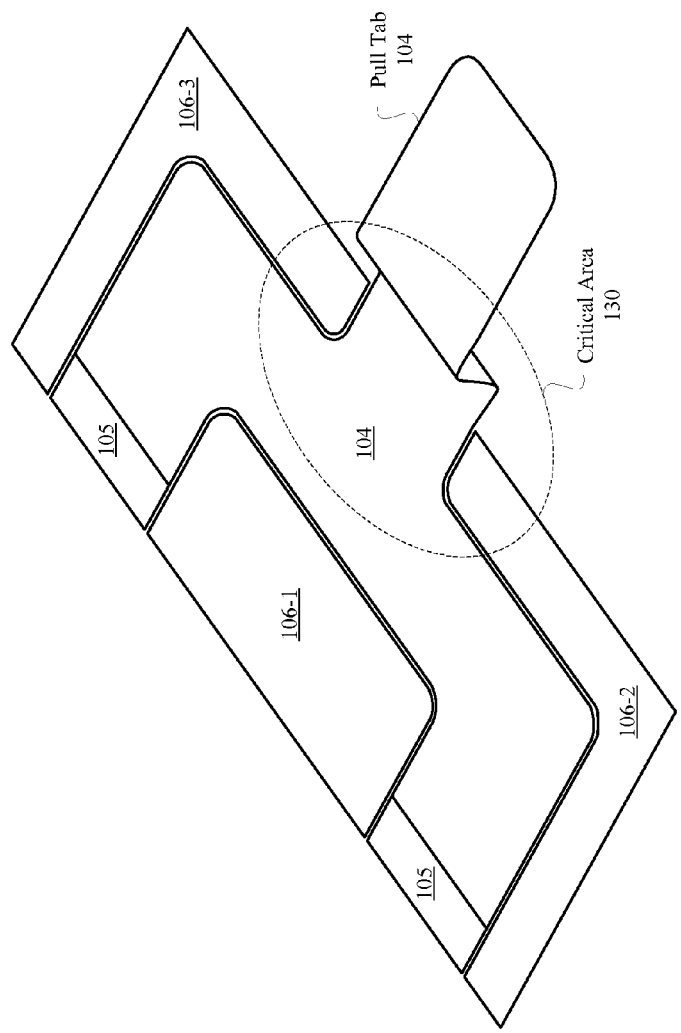
FIG. 1C

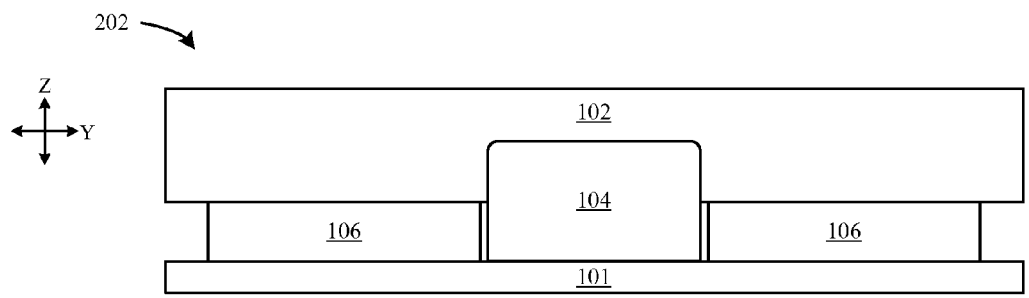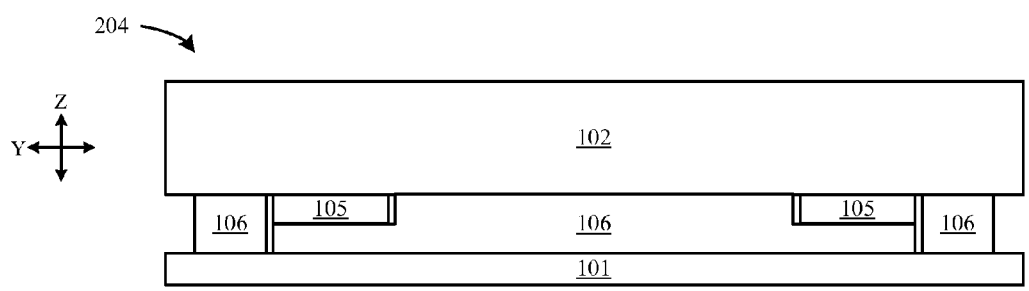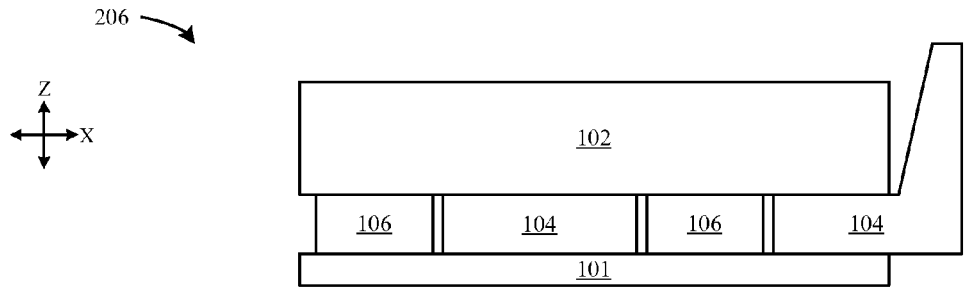
FIG. 2B

```
┌─────────────────────────────────────────────────────────────────────┐
│ Manufacturing a pull tab designed to facilitate the removal of a    │
│ battery from the casing of a portable computing device, where the   │
│ pull tab is at least partially reinforced to prevent tearing when   │
│ removing the battery                                                │
│                              402                                    │
└─────────────────────────────────────────────────────────────────────┘
                                   │
                                   ▼
┌─────────────────────────────────────────────────────────────────────┐
│ Applying an adhesive layer to each area that is exposed between the │
│ pull tab and the casing when the pull tab is disposed between the   │
│ battery and the casing                                              │
│                              404                                    │
└─────────────────────────────────────────────────────────────────────┘
                                   │
                                   ▼
┌─────────────────────────────────────────────────────────────────────┐
│ Applying pressure to the battery and/or casing such that the        │
│ battery and casing are adhered to one another                       │
│                              406                                    │
└─────────────────────────────────────────────────────────────────────┘
                                   │
                                   ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Folding a graspable portion of the pull tab that extends out from   │
│ between the batter and the casing                                   │
│                              408                                    │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

*FIG. 4*

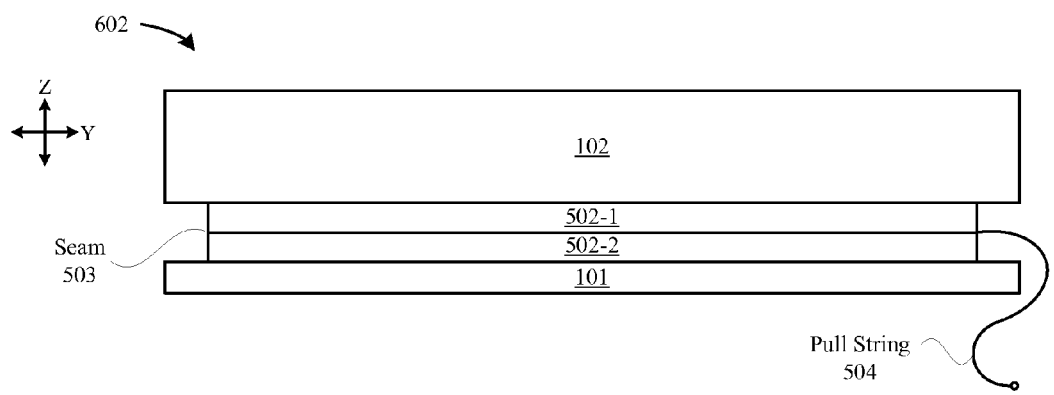
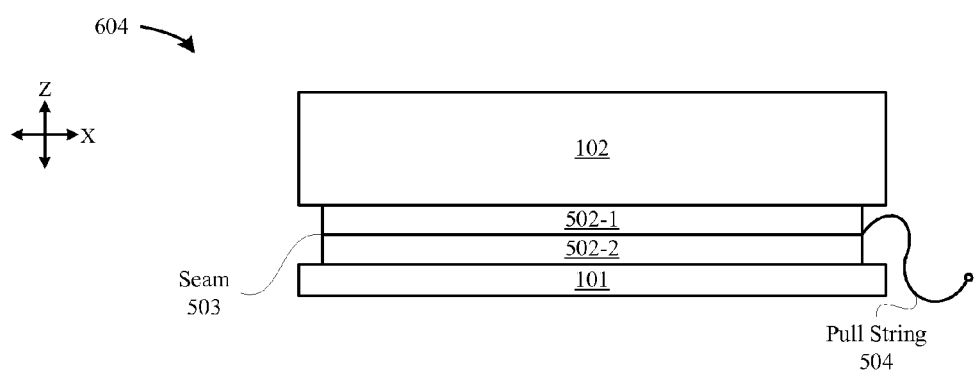
FIG. 6B

BATTERY REMOVAL APPARATUS

BACKGROUND

Technical Field

The described embodiments relate generally to battery removal apparatuses. More specifically, disclosed herein are battery removal apparatuses that sufficiently secure a battery within a portable computing device yet provide ease of removal for servicing.

Related Art

Manufacturers continually strive to enhance the physical qualities of portable computing devices so as to provide an excellent user experience and keep an edge on their competitors. Notably, the widths and lengths of most portable computing devices—such as smart phones and laptops—have recently remained somewhat constant, since users require a threshold amount of surface area to comfortably interact with (e.g., user interfaces displayed on smart phones or physical keyboards of laptops). Other physical qualities of portable computing devices, however—including thickness (i.e., height) and weight—can continue to be reduced to provide an increase in overall user satisfaction. As a result, manufacturers are focused on developing new materials and designs that reduce the overall height and/or weight of portable computing devices.

Presently, there are several factors that limit the potential reduction of height that can be applied to a portable computing device, e.g., a smart phone. In many cases, the most limiting factor is the battery included in the smart phone, which remains somewhat large with respect to the overall volume of the smart phone. Notably, the battery must be secured within the smart phone such that the battery remains in place in the event of a fall and does not damage other electronics included within the smart phone. One popular battery-securing technique involves applying a relatively thick adhesive layer to the battery, but this limits potential for reductions in height and can make it difficult to remove the battery for replacement or servicing. Moreover, while measures to simply thin the adhesive layer would result in increased potential for height reduction, such measures would also compromise the stability of the battery within the portable computing device, which is unacceptable.

SUMMARY

This paper describes various embodiments that relate to battery removal apparatuses to be used within portable computing devices. In particular, the battery removal apparatuses described herein enable a battery to be securely installed into a portable computing device while also enabling the battery to be easily removed from the portable computing device when servicing or replacement is required. Notably, the battery removal apparatuses described herein also provide increased potential for height reduction compared to conventional approaches without compromising the overall secureness of the battery within the portable computing device.

In a first embodiment, a component extractor used for extracting a component secured to an interior surface of an enclosure by an adhesive layer is disclosed. The component extractor includes a body, where at least a portion of the body is disposed within the adhesive layer. The component extractor also includes a flexible member coupled to the body at a reinforced first end and having a second end opposite the first end, where the second end is configured to receive an externally applied extraction force. In particular, during a component extraction operation, the externally applied extraction force is received at the second end at an angle with respect to the component. At least some of the extraction force is transferred from the second end through the reinforced first end to the body such that the extraction force at least partially reduces an adhesive bond formed between the component and the interior surface by the adhesive layer.

In another embodiment, a pull tab battery removal apparatus for removing a battery from a portable computing device is disclosed. The pull tab battery removal apparatus comprises a pull tab configured to be disposed between a battery and a casing of the portable computing device, where the pull tab is reinforced at least at a graspable portion of the pull tab that protrudes out from between the battery and the casing. The pull tab is shaped such that at least one area of the battery and the casing are exposed to one another when the battery, the pull tab and the casing are compressed together. The at least one exposed area between the battery an the casing is occupied by an adhesive layer that adheres the battery to the casing when the battery, the pull tab, and the casing are compressed together.

In yet another embodiment, a pull string battery removal apparatus for removing a battery from a portable computing device is disclosed. The pull string battery removal apparatus comprises an adhesive layer that includes a seam defined by first layer and a second layer, where the first layer is configured to adhere to a battery and the second layer is configured to adhere to a casing of the portable computing device. The pull string battery removal apparatus further comprises a pull string that is routed through the seam according to a particular path such that, when a first end of the pull string that protrudes out from the adhesive layer is pulled on, the pull string cuts through the adhesive layer and causes the seam to fully or partially separate from one another so that the battery can be removed from the casing.

Other embodiments include portable computing devices configured to include the pull tab battery removal apparatus, the pull string battery removal apparatus, or a combined approach that utilizes components from each of the pull tab battery removal apparatus and the pull string battery removal apparatus.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

FIGS. 1A-1C illustrate perspective views of a pull tab battery removal apparatus, according to one embodiment of the invention.

FIGS. 2A-2B illustrate cross-sectional perspective views of the pull tab battery removal apparatus of FIGS. 1A-1C, according to one embodiment of the invention.

FIG. 4 illustrates a method for configuring the pull tab battery removal apparatus, according to one embodiment of the invention.

FIGS. 6A-6B illustrate cross-sectional perspective views of the pull string battery removal apparatus of FIGS. 5A-5B, according to one embodiment of the invention.

DETAILED DESCRIPTION OF SELECTED EMBODIMENTS

Representative applications of methods and apparatus, according to the present application, are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made, without departing from the spirit and scope of the described embodiments.

Figure 1A:
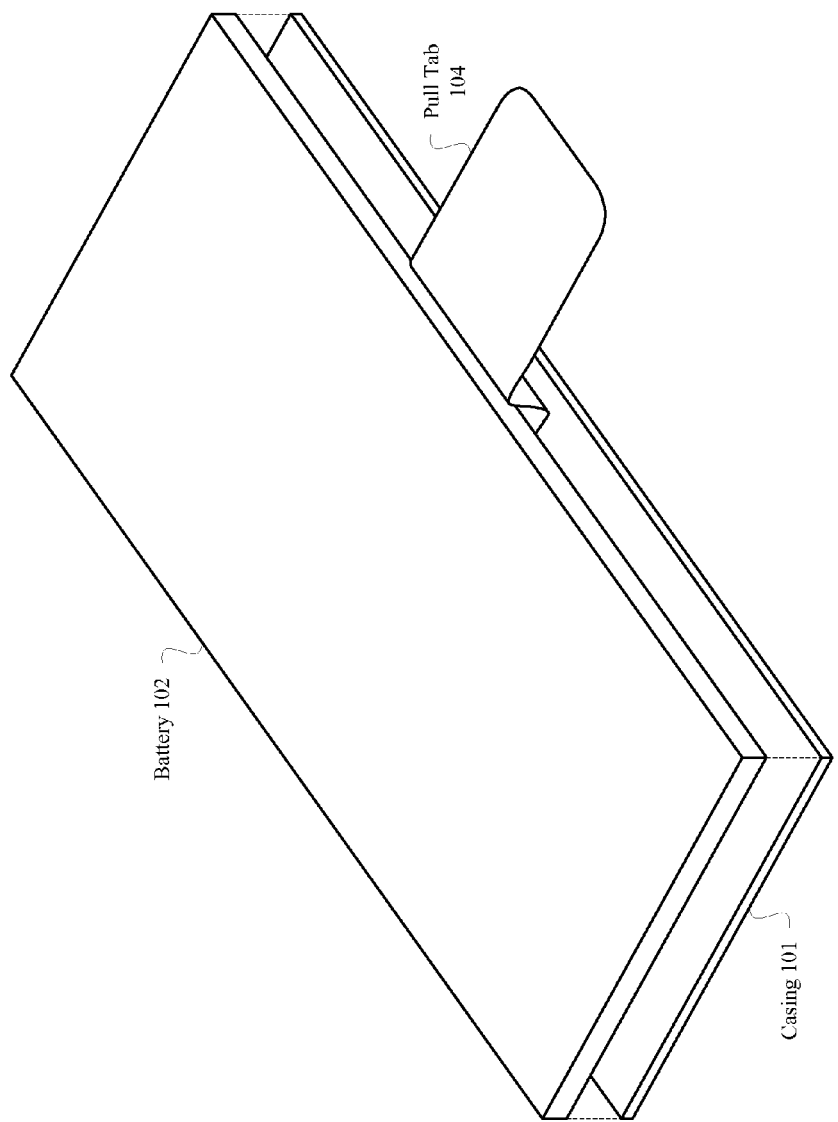
Figure 1B:
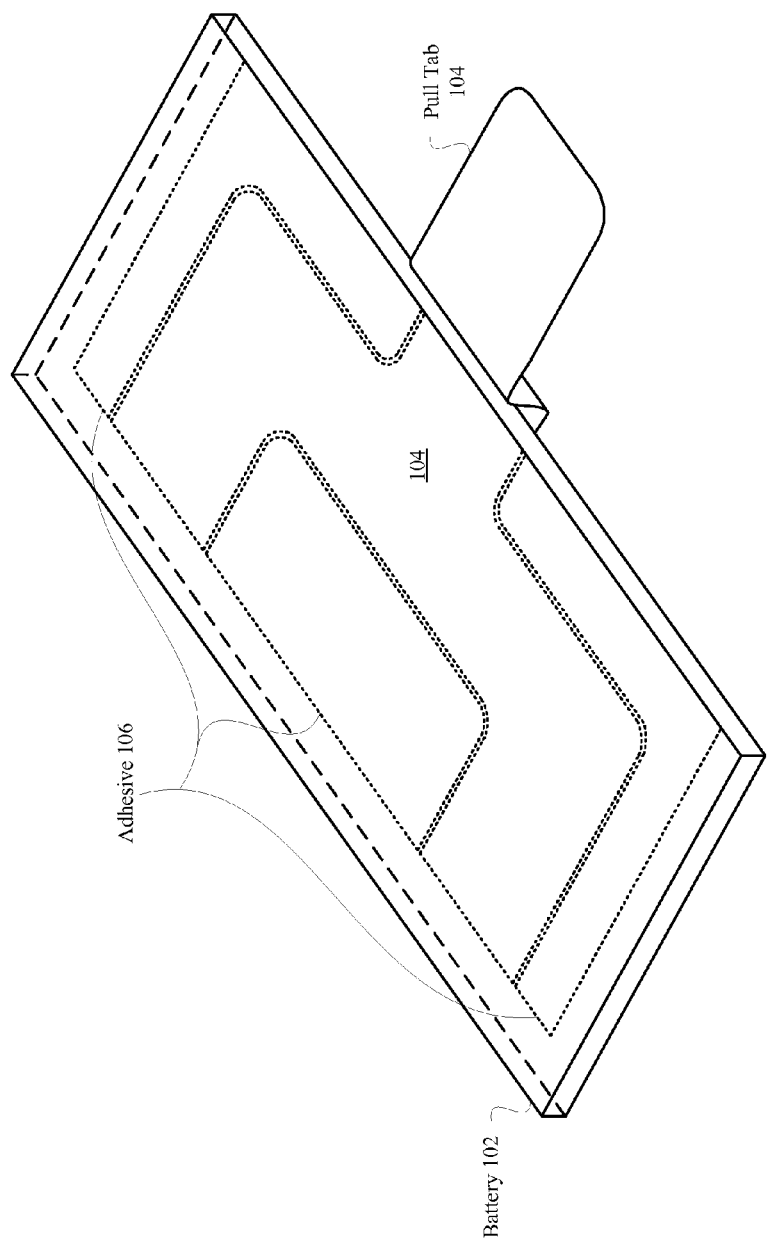

As set forth above, one common technique for securing a battery within a portable computing device involves using an adhesive layer. When the battery needs to be removed from the portable computing device, service technicians are required to pry the battery away from the casing, which can damage the battery and/or casing. One technique that can be used to help mitigate this problem involves using a pull tab that facilitates a controlled separation of the battery from the adhesive layer. According to one configuration, the pull tab is a sheet of material that is disposed between the battery and the casing and lies on the same plane as one or more adhesive layers, where a graspable portion of the sheet of material extends out from between the battery and the casing. In general, the pull tab is the same thickness as the adhesive layers and is shaped such that one or more areas of the battery are exposed to the casing when the battery, the pull tab, and the casing are compressed together. According to this configuration, the adhesive layers cover the exposed areas, while the pull tab covers the unexposed areas, such that the battery is partially—but securely—adhered to the casing. In this manner, a service technician can pull the graspable tab in an upward direction to remove the battery from the portable computing device. Notably, FIGS. 1A-1B illustrate perspective views of this configuration and provide a visual representation of the manner in which the pull tab enables the battery to be removed from the adhesive layers. As noted above, however, the adhesive layers and/or pull tab consume precious space within the portable computing device.

One simple approach to decrease the amount of space consumed by the adhesive layers and the pull tab involves simply decreasing their thicknesses, but this can create a new set of problems. For example, decreasing the thickness of the adhesive layers can correspondingly reduce the secureness of the battery and make other components within the portable computing device vulnerable to damage when it is dropped. One way to mitigate this problem involves using a stronger adhesive such that, despite the layers of adhesive being thinner, the battery can be amply secured within the portable computing device. However, for the increased space benefit of the thinner adhesive layers to be fully realized, the pull tab must also be decreased in thickness since it lies on the same plane as the adhesive layers, which reduces the rigidity and strength of the pull tab. Consequently, the thinner pull tab is vulnerable to tearing when a service technician lifts the graspable portion of the pull tab upward to remove the battery from the portable computing device. If or when the pull tab tears, the service technician is required to manually pry the battery away from the casing—which, as described above, can easily damage the portable computing device.

Accordingly, one embodiment of the invention sets forth a "component extractor" used for extracting a component secured to an interior surface of an enclosure by an adhesive layer. The component extractor includes a body, where at least a portion of the body is disposed within the adhesive layer. The component extractor also includes a flexible member coupled to the body at a reinforced first end and having a second end opposite the first end, where the second end is configured to receive an externally applied extraction force. In particular, during a component extraction operation, the externally applied extraction force is received at the second end at an angle with respect to the component. At least some of the extraction force is transferred from the second end through the reinforced first end to the body such that the extraction force at least partially reduces an adhesive bond formed between the component and the interior surface by the adhesive layer.

Another embodiment of the invention sets forth a more specific battery removal apparatus that incorporates a thinned pull tab that is reinforced to reduce the likelihood of tearing when used to remove a battery from a portable computing device. Such reinforcement can be provided according to a variety of techniques, which are described in detail below in conjunction with FIGS. 3A-3B and 4. One advantage provided by the thinner, reinforced pull tab is that a thinner layer of stronger adhesive can be used while amply securing the battery within the portable computing device. As a result, the overall thickness of both the adhesive layer and the pull tab can be reduced, and additional room is established that can be exploited to enhance the portable computing device. For example, the height of the portable computing device can be reduced to produce a thinner portable computing device that includes the same battery and possesses the same battery life performance. Alternatively, the thickness of the battery can be increased in order to extend the battery life performance of the portable computing device without needing to correspondingly increase the height of the portable computing device.

In some cases, it may be desirable to provide a battery removal apparatus that does not rely on the thinner, reinforced pull tab. Accordingly, another embodiment of the invention sets forth yet another more specific battery removal apparatus that comprises an adhesive layer throughout which one or more pull strings are routed. In particular, the pull strings are routed such that, when ends of the pull strings are pulled on by a service technician, the pull strings cut apart the adhesive layer and partially or completely eliminate the adhesion between the battery and the casing. The pull strings can be routed through the adhesive layer in a variety of ways, which are described in detail below in conjunction with FIGS. 5A-5B, 6A-6B, 7A-7B and 8. One advantage provided by the pull string approach is that a strong, thin layer of adhesive can be used while maintaining a way for a service technician to easily remove the battery from the portable computing device. As a result, additional room is established and can be exploited to enhance the portable computing device in the manners described above.

Yet another embodiment of the invention sets forth a battery removal apparatus that utilizes both the pull tab and the pull string techniques described above. In particular, both the adhesive layer and the pull tab are thinned to establish additional room within the portable computing device. However, instead of reinforcing the thinned pull tab, one or more pull strings are incorporated into the adhesive layers near the graspable portion of the pull tab, which, as described in greater detail below in conjunction with FIG. 1C, is the portion of the pull tab that is most vulnerable to being torn during the battery removal process. According to this embodiment, to remove the battery from the portable computing device, the service technician first severs the adhesive layers near the graspable portion of the pull tab using the one or more pull strings. Subsequently, the service technician uses the pull tab to overcome the adhesion that remains between the battery and the casing. One advantage provided by this combined approach is that both the pull tab and the adhesive layer can simply be reduced in thickness without requiring reinforcement of the pull tab.

These and other embodiments are discussed below with reference to FIGS. 1A-1C, 2A-2B, 3A-3B, 4, 5A-5B, 6A-6B, 7A-7B, and 8; however, those skilled in the art will readily appreciate that the detailed description given herein with respect to these figures is for explanatory purposes only and should not be construed as limiting. It is noted that the elements illustrated in FIGS. 1A-1C, 2A-2B, 3A-3B, 4, 5A-5B, 6A-6B, 7A-7B, and 8 are not drawn to scale, nor do they represent dimensions that are relative to one another. In contrast, the elements can be of any dimension without departing from the scope of the invention.

FIGS. 1A-1C illustrate perspective views of a pull tab battery removal apparatus, according to one embodiment of the invention. In particular, FIG. 1A illustrates a perspective view 100 of a casing 101, a battery 102, and a pull tab 104, where the casing 101 represents a surface within a portable computing device, e.g., a smart phone or a laptop. As shown in FIG. 1A, and as described above, the pull tab 104 is disposed between the casing 101 and the battery 102 such that the pull tab 104 can be used by a service technician to remove the battery 102 from the portable computing device. In particular, the service technician lifts the pull tab 104 at a ninety degree angle to the casing 101 such that the battery is slowly peeled away from adhesive layers that are disposed between the casing 101 and the battery 102, which is described in further detail below in conjunction with FIGS. 1B-1C. Those having skill in the art will understand that the graspable portion of the pull tab 104 is not limited to a single side of the casing 101 and can be oriented such that the battery 102 can be removed from the portable computing device in any direction that is most convenient with respect to how other components are configured within the portable computing device.

FIG. 1B illustrates a perspective view 125 where the top layer of the battery 102 is transparent such that the underlying configuration of the pull tab 104 and adhesive layers 106 is visible. As shown in FIG. 1B, the pull tab 104 is routed underneath the battery 102 and is shaped in a manner that enables various areas of the battery 102 to be exposed to the casing 101 when the battery 102, the pull tab 104, and the casing 101 are compressed together. Those having skill in the art will appreciate that the shape of the pull tab 104 is not limited to the configuration illustrated in FIG. 1B and that any shape can be used such that at least a portion of the battery 102 is exposed to the casing 101 when the battery 102, the pull tab 104, and the casing 101 are compressed together. According to the illustration in FIG. 1B, the adhesive layers 106 are shaped and applied such that, in general, they only adhere to the battery 102 and the casing 101 and do not interact with the main portion of the pull tab 104. In one embodiment, the adhesive layers 106 are first applied to the battery 102 and then the casing 101, whereupon the battery 102, pull tab 104 and the casing 101 are appropriately oriented and compressed together so as to establish sufficient adhesion between the battery 102 and the casing 101. Alternatively, the adhesive layers 106 can first be applied to the casing 101 and then the battery 102, whereupon the battery 102, the pull tab 104 and the casing 101 are appropriately oriented and compressed together so as to establish sufficient adhesion between the battery 102 and casing 101. In general, sufficient adhesion represents a particular level of secureness that prevents the battery 102 from moving or shifting within the portable computing device in the event of a drop.

FIG. 1C illustrates a perspective view 150 that displays in isolation the adhesive layers 106 and the pull tab 104. FIG. 1C also highlights rear portions 105 of the pull tab 104 that are adhered to adhesive layers 106 (or another adhesive layer) such that the rear portions 105 are anchored to the casing 101. In this way, the pull tab 104 remains attached to the casing 101 before, during and after the battery 102 is removed from the portable computing device. This configuration beneficially prevents the pull tab 104 from, for example, ripping away from the casing 101 before the battery 102 is completely removed from the portable computing device, which can result in the battery 102 landing back on the adhesive layers 106 without the pull tab 104 being disposed between the battery 102 and the adhesive layers 106. In this scenario, a service technician would be required to pry the battery 102 from the casing 101, which, as described above, can easily damage the battery 102 and/or the casing 101.

FIG. 1C also highlights a critical area 130 that represents at least one area of the pull tab 104 that is vulnerable to tearing when the pull tab 104 is thinned and used by a service technician to remove the battery 102 from the portable computing device. Consider, for example, the adhesive layers 106-2 and 106-3, which are located along the battery 102 and the casing 101 and are shaped in a manner that causes considerable strain to be placed on the critical area 130 when the pull tab 104 is used to remove the battery 102 from the portable computing device. Accordingly, embodiments of the invention set forth various techniques—which are described below in conjunction with FIGS. 3A-3B and 4—that can be used to reinforce the thinned pull tab 104 so that tearing of the pull tab 104 can be avoided.

Figure 2A:
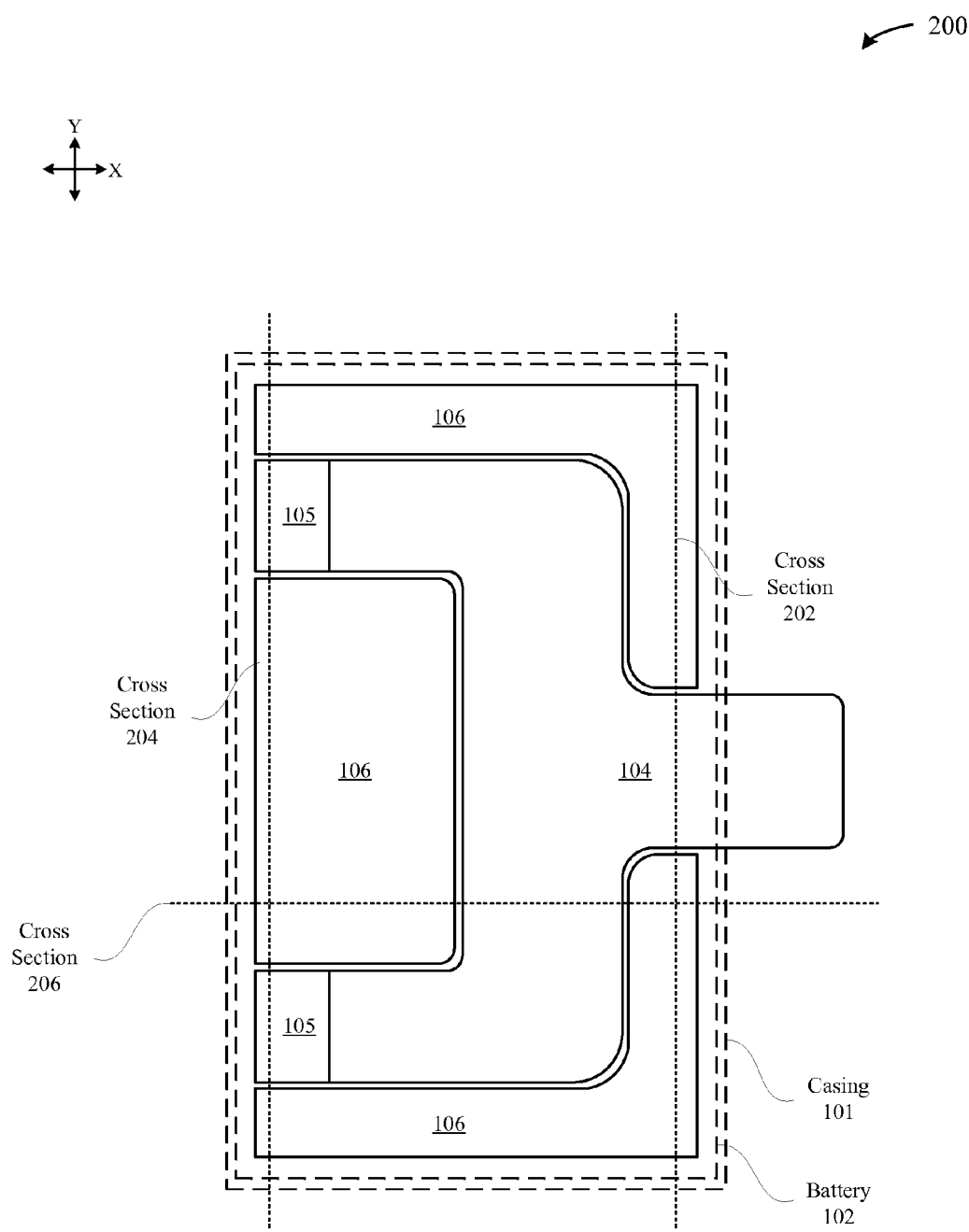

FIGS. 2A-2B illustrate cross-sectional perspective views 200 of the pull tab battery removal apparatus of FIGS. 1A-1C, according to one embodiment of the invention. More specifically, a cross section 202, a cross section 204, and a cross section 206 are specified against a flattened perspective view of the pull tab battery removal apparatus, and a detailed view is provided in FIG. 2B for each of the cross section 202, the cross section 204, and the cross section 206.

As illustrated by the view 225 of FIG. 2B, the cross section 202 of the pull tab battery removal apparatus includes the battery 102, adhesive layers 106, the graspable portion of the pull tab 104, and the casing 101, where the adhesive layers 106 and the pull tab 104 are disposed between the battery 102 and the casing 101. In this manner, the battery 102 is adhered to the casing 101 yet can be removed via the pull tab 104 by lifting the pull tab 104 at a ninety degree angle to the casing 101. As also illustrated in FIG. 2B, the cross section 204 of the pull tab battery removal apparatus includes the battery 102, adhesive layers 106, the rear portions 105 of the pull tab 104, and the casing 101. Further illustrated in FIG. 2C is the cross section 206 of the pull tab battery removal apparatus, which includes the battery 102, adhesive layers 106, portions of the pull tab 104, and the casing 101. As with the cross section 202 described above, the adhesive layers 106 and the pull tab 104 are disposed between the battery 102 and the casing 101, where the graspable portion of the pull tab 104 protrudes out from between the battery 102 and casing 101. As previously described above, this graspable portion enables a service technician to grip the pull tab 104 and lift the pull tab 104 at a ninety degree angle against the casing 101 so that the battery 102 can be removed from the portable computing device.

Figure 3A:
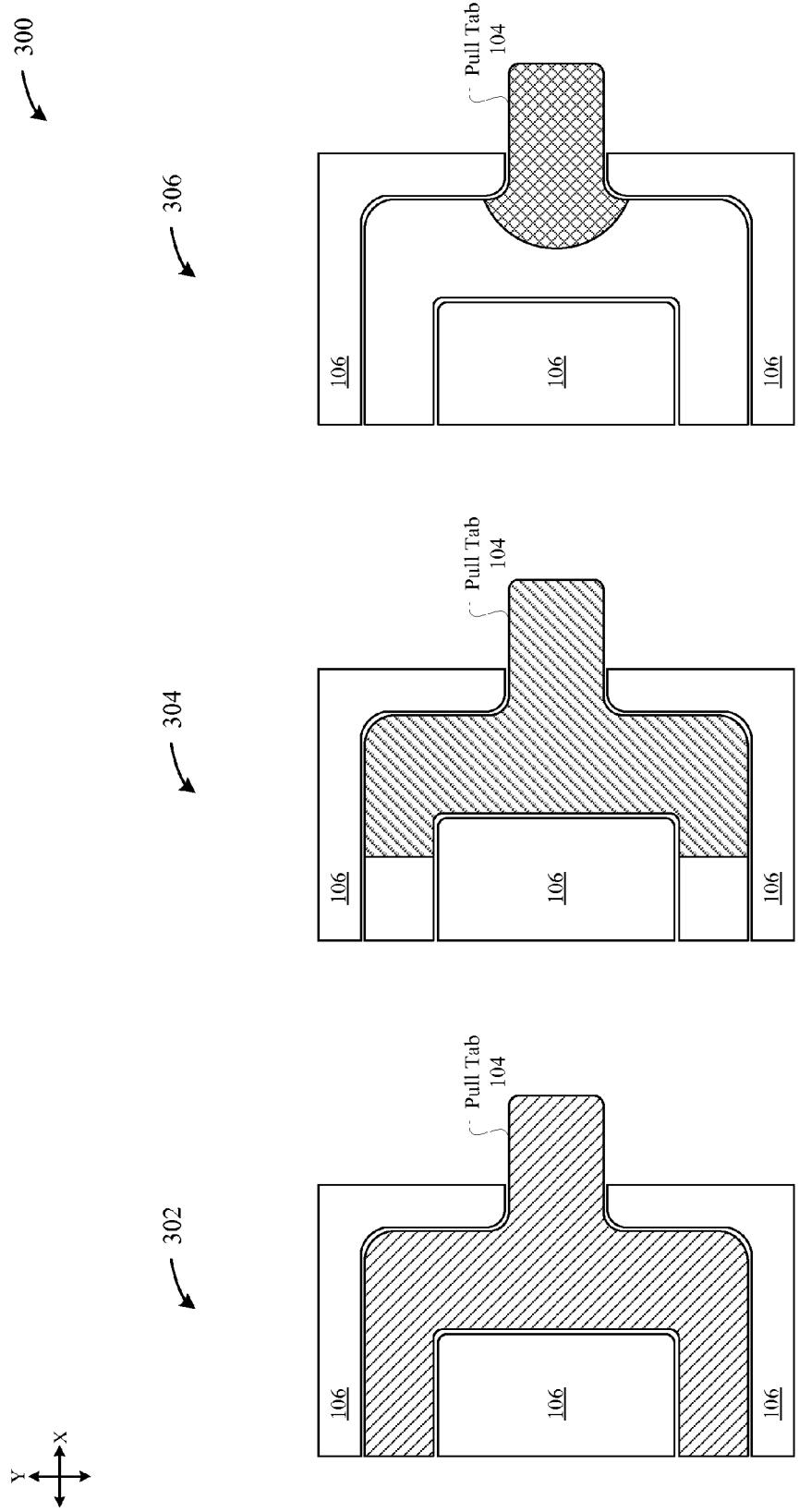
FIGS. 3A-3B illustrate various embodiments for reinforced configurations of the pull tab battery removal apparatus.
Figure 3B:
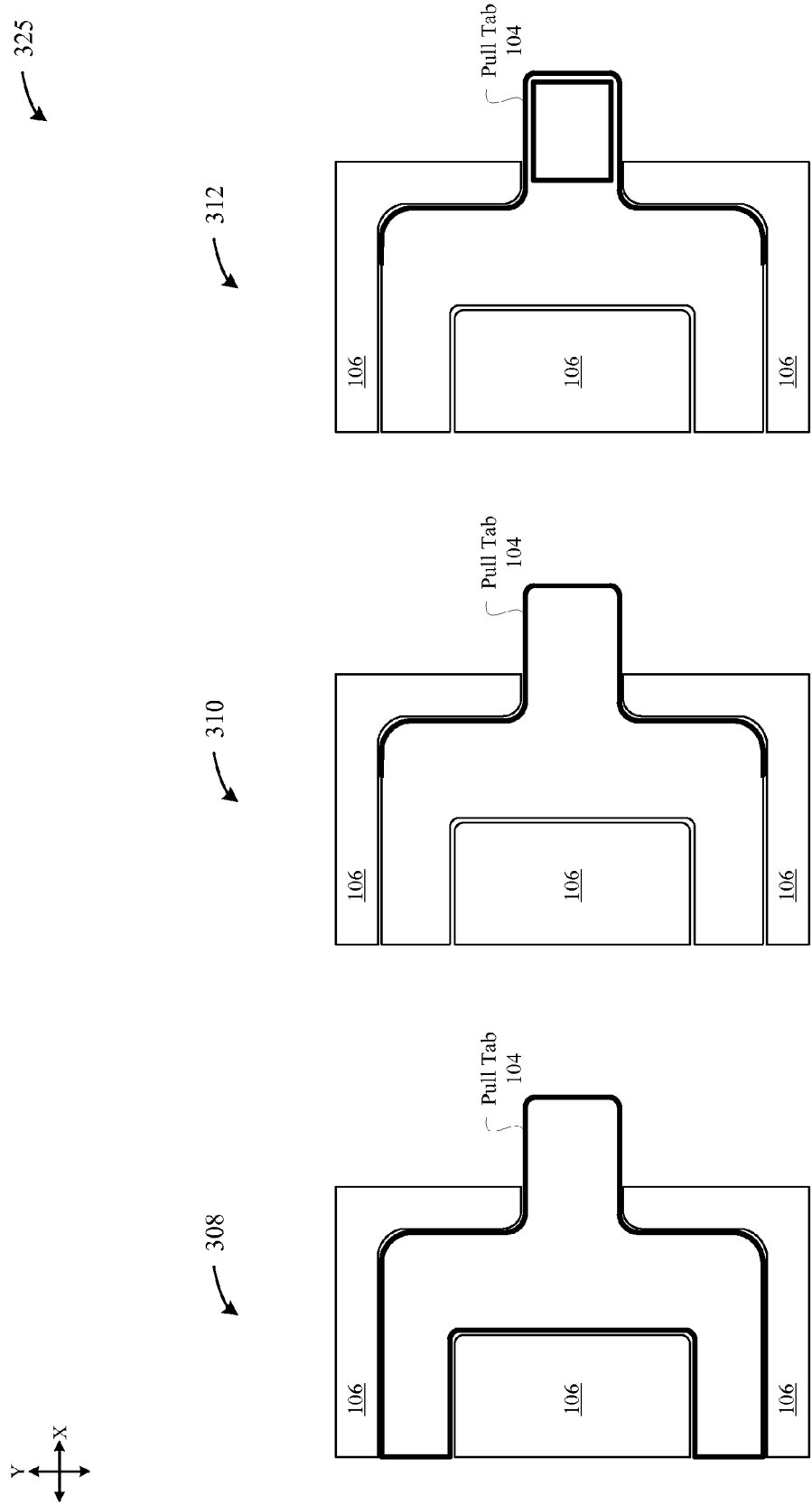

As described above, the critical area 130 represents an area of the pull tab 104 that becomes increasingly vulnerable to tearing as the overall thickness of the pull tab 104 and/or adhesive layers 106 is reduced in attempt to free up space within the portable computing device. Accordingly, FIGS. 3A-3B illustrate configurations 300 that set forth techniques that enable all or a portion of the pull tab 104 to be reinforced. In particular, a configuration 302 involves utilizing a thinned pull tab 104 that is wholly reinforced according to a variety of techniques that can include, but are not limited to, inner fiber reinforcement using a cross-hatch pattern, inner fiber reinforcement using a weave, or the like. The inner reinforcement can be provided by utilizing a variety of materials that can include, but are not limited to, metal, carbon fiber, Kevlar, strong filaments, and the like. Such inner fiber reinforcement in the configuration 302 is represented by the fill pattern within the pull tab 104. In this manner, a thinner pull tab 104 can be utilized within the portable computing device without compromising the overall strength of the pull tab 104, which helps reduce the likelihood that the pull tab 104 will tear when used to remove the battery 102 from the portable computing device.

Also illustrated in FIG. 3A is a configuration 304 that involves utilizing a thinned pull tab 104 that is partially reinforced according to the techniques described above. Notably, the inner reinforcement of the pull tab 104 is reduced or eliminated toward the rear portions 105 of the pull tab 104 since, as the pull tab 104 lifts upward and progressively removes the battery 102 from the portable computing device, the overall force being exerted on the pull tab 104 diminishes. Thus, the configuration 304 can provide ample reinforcement to the pull tab 104 and potentially reduce overall cost and complexity of producing the pull tab 104 depending on the tools and materials that are available.

Further illustrated in FIG. 3A is a configuration 306 that specifically targets the critical area 130 illustrated in FIG. 1C. In particular, in configuration 306, the pull tab 104 is reinforced only near the graspable portion of the pull tab 104—which, as set forth above, endures the most force during battery 102 removal as a consequence of the orientation of the adhesive layers 106 that lie perpendicular to the graspable portion of the pull tab 104. As with the configuration 304, the configuration 306 can also provide ample reinforcement to the pull tab 104 and, in some cases, potentially reduce overall cost and complexity of producing the pull tab 104.

Additional configurations 325 are illustrated in FIG. 3B and include a configuration 308, a configuration 310, and a configuration 312. In particular, configuration 308 involves utilizing a thinned pull tab 104 that is wholly reinforced according to a variety of techniques that can include, but are not limited to, outer fiber reinforcement using a variety of materials such as metal, carbon fiber, Kevlar, strong filaments, and the like. Such outer fiber reinforcement in the configuration 308 is represented by the thickened perimeter of the pull tab 104. In this manner, a thinner pull tab 104 can be utilized within the portable computing device without compromising the overall strength of the pull tab 104, which helps reduce the likelihood that the pull tab 104 will tear when the battery 102 is being removed from the portable computing device.

Also illustrated in FIG. 3B is a configuration 310 that involves utilizing a thinned pull tab 104 that is partially reinforced according to the techniques provided above. Notably, the outer reinforcement of the pull tab 104 is reduced or eliminated toward the rear portions 105 of the pull tab 104 since, as the pull tab 104 lifts upward and progressively removes the battery 102 from the portable computing device, the overall force being exerted on the pull tab 104 diminishes. Thus, the configuration 308 can provide ample reinforcement to the pull tab 104 and potentially reduce overall cost and complexity of producing the pull tab 104 depending on the tools and materials that are available.

Further illustrated in FIG. 3B is a configuration 312 that specifically targets the critical area 130 illustrated in FIG. 1C. In particular, and as with the configuration 306, in configuration 312 the pull tab 104 is reinforced only near the graspable portion of the pull tab 104—which, as set forth above, endures the most force during battery 102 removal as a consequence of the orientation of the adhesive layers 106 that perpendicular to the graspable portion of the pull tab 104. As illustrated by the configuration 312, the graspable portion of the pull tab 104 can be hollow such that a service technician can easily pull on the graspable portion of the pull tab 104 without it slipping from between his or her fingers. As with the configuration 310, the configuration 312 can also provide ample reinforcement to the pull tab 104 and, in some cases, potentially reduce overall cost and complexity of producing the pull tab 104.

FIG. 4 illustrates a method 400 for configuring the pull tab battery removal apparatus, according to one embodiment of the invention. As shown, the method 400 begins at step 402, which involves manufacturing the pull tab 104, e.g., manufacturing the pull tab 104 according to the shape illustrated in FIGS. 1B-1C. At step 404, adhesive layers 106 are applied to each area that is exposed between the pull tab 104 and the casing 101 when the pull tab 104 is disposed between the battery 102 and the casing 101, e.g., as illustrated in FIG. 1C. At step 406, pressure is applied to the battery 102 and/or casing 101 such that the battery 102 and casing 101 are adhered to one another, e.g., as illustrated in FIG. 1A. At optional step 408, the graspable portion of the pull tab 104 that extends out from between the battery 102 and the casing 101 is folded such the pull tab 104 can be conveniently grasped by a service technician when removing the battery 102.

Figure 5A:
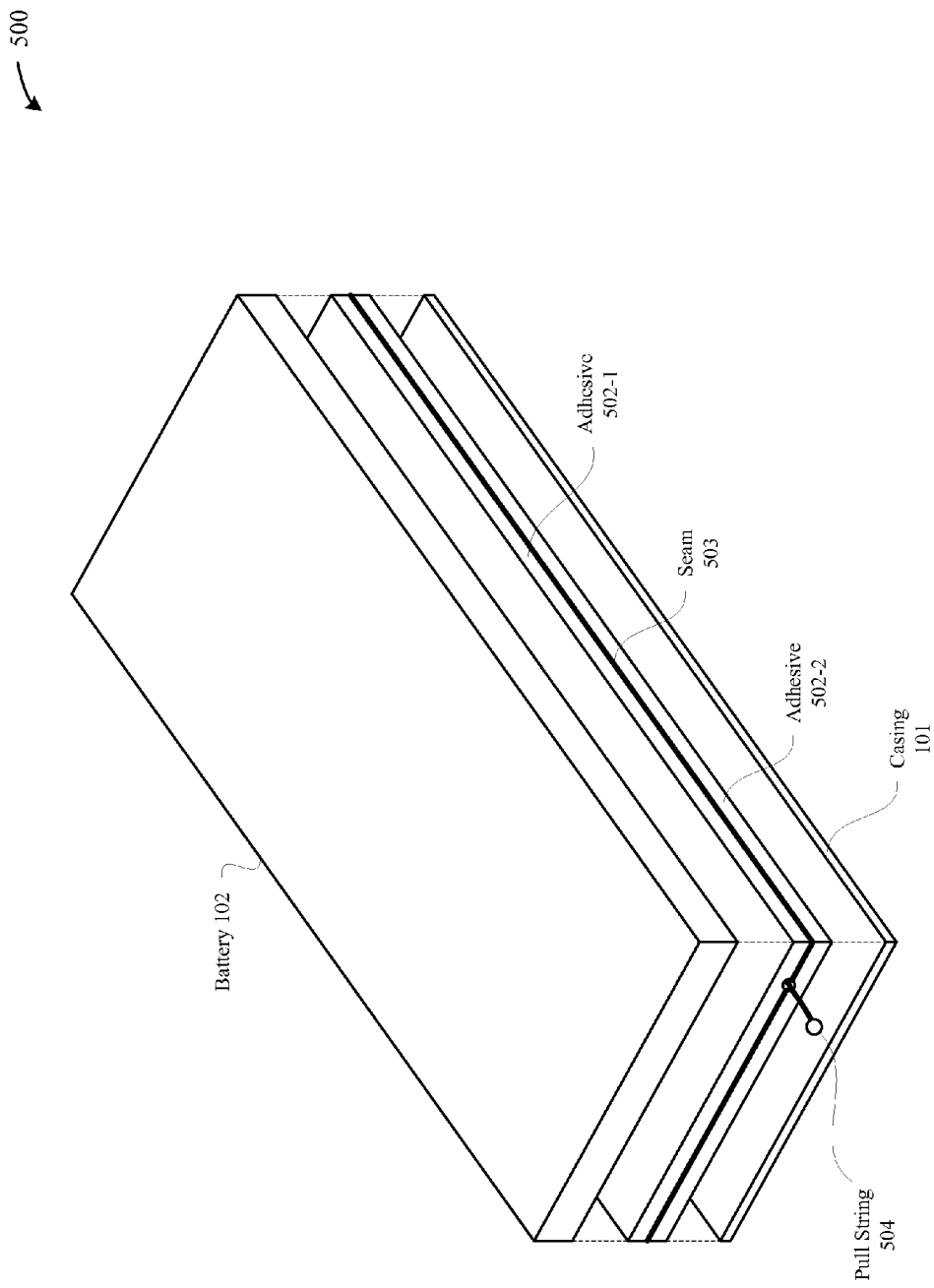
FIGS. 5A-5B illustrate a perspective view of a pull string battery removal apparatus, according to one embodiment of the invention.
Figure 5B:
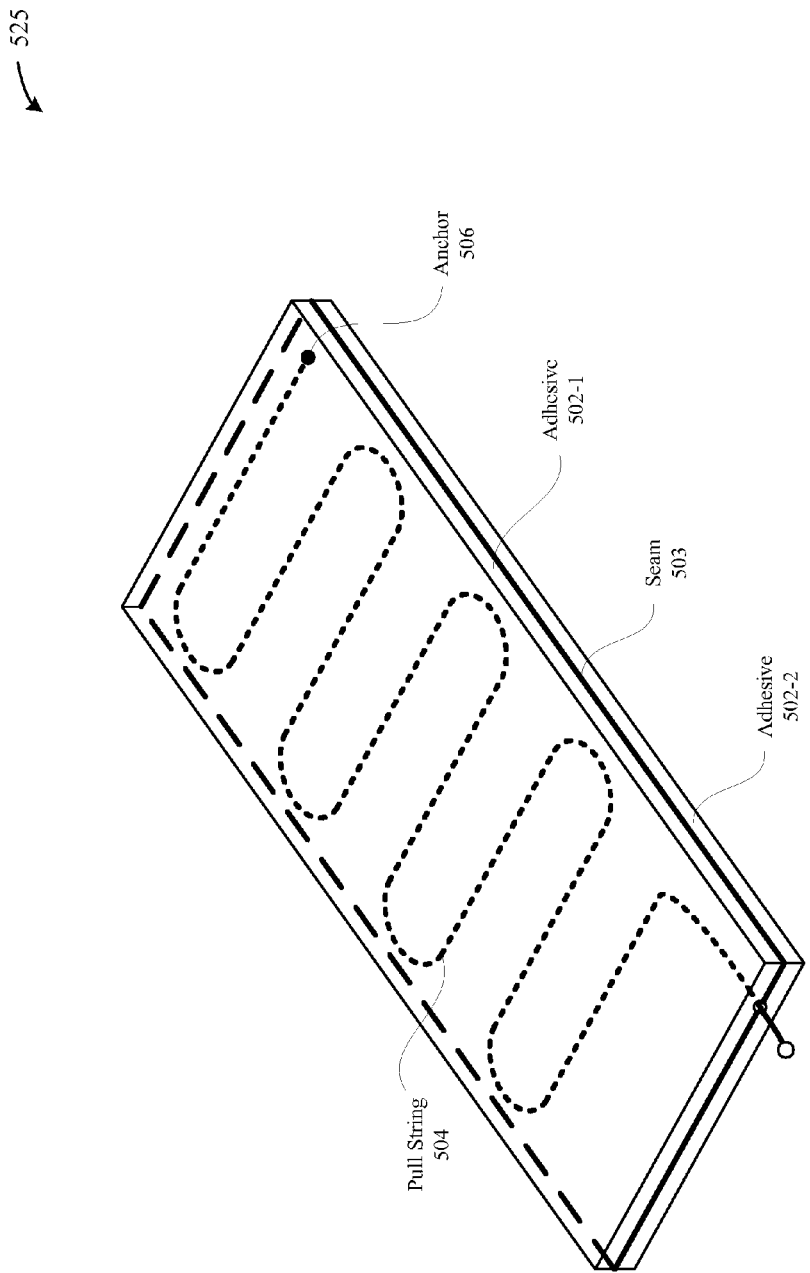

As noted above, in some cases, it may be desirable to provide a battery removal apparatus that does not rely on the thinner, reinforced pull tab 104 described above in conjunction with FIGS. 1A-1C, 2A-2B, 3A-3B, and 4. Accordingly, FIGS. 5A-5B, 6A-6B, 7A-7B, and 8 illustrate various embodiments of a pull string battery removal apparatus. In particular, FIG. 5A illustrates a perspective view 500 of a pull string battery removal apparatus, which includes the casing 101, the battery 102, and an adhesive layer 502. As shown in FIG. 5, the adhesive layer 502 comprises a first layer 502-1 and a second layer 502-2 that form a seam 503. Also shown in FIG. 5 is a graspable portion of a pull string 504 that protrudes out of adhesive layer 502 along the seam 503. As described in greater detail below in conjunction with FIGS. 5B, 6A-6B, 7A-7B, and 8, the pull string 504 is routed throughout the adhesive layer 502 such that when a technician pulls the graspable portion of the pull string 504 away from the casing 101 the adhesive layer 502 is fully or partially separated along the seam 503. Those having skill in the art will understand that the graspable portion of the pull string 504 is not limited to a single side of the casing 101 and can be oriented such that the battery 102 can be removed from the portable computing device in any direction that is most convenient with respect to how other components are configured within the portable computing device.

FIG. 5B illustrates a perspective view 525 that displays in isolation the adhesive layer 502-1, the adhesive layer 502-2, and the pull string 504, where the adhesive layer 502-1 is transparent such that the path of the pull string 504 is shown. As shown in FIG. 5B, the pull string 504 is anchored at anchor 506 and is routed between the adhesive layer 502-1 and the adhesive layer 502-2 according to a switchback pattern such that when the graspable portion of the pull string 504 is pulled on by a technician the pull string 504 cuts through the adhesive layer 502 and causes the adhesive layer 502 to fully or partially separate along the seam 503. The anchor 506 can be established according to a variety of techniques, such as gluing one end of the pull string 504 to the casing 101. Alternatively, an end of the pull string can be attached to a component that is shaped such that the adhesive layer 502-1 and the adhesive layer 502-2 prevent the component—and the end of the pull string 504—from moving when the graspable portion of the pull string 504 is pulled on by a service technician.

When the adhesive layer 502 is fully or partially separated the battery 102 can effectively be removed from the portable computing device. According to the embodiment illustrated in FIG. 5B, the adhesive layer 502-1 would remain attached to the battery 102 after a technician utilizes the pull string 504 to fully or partially separate the adhesive layer 502. In this manner, a replacement battery for the portable computing device could be manufactured such that a replacement adhesive 502-1 is attached to the replacement battery and, further, a replacement pull string 504 is applied to the replacement adhesive 502-1 and routed according to path illustrated in FIG. 5B. As a result, subsequent removal of the replacement battery, if necessary, would require the service technician to simply pull on the replacement pull string 504 in the manner described above. Those having skill in the art will appreciate that the path of the pull string 504 is not limited to the configuration illustrated in FIG. 5B and that any path can be used such that when the pull string 504 is pulled on by a service technician the adhesive layer 502 is fully or partially separated.

Figure 6A:
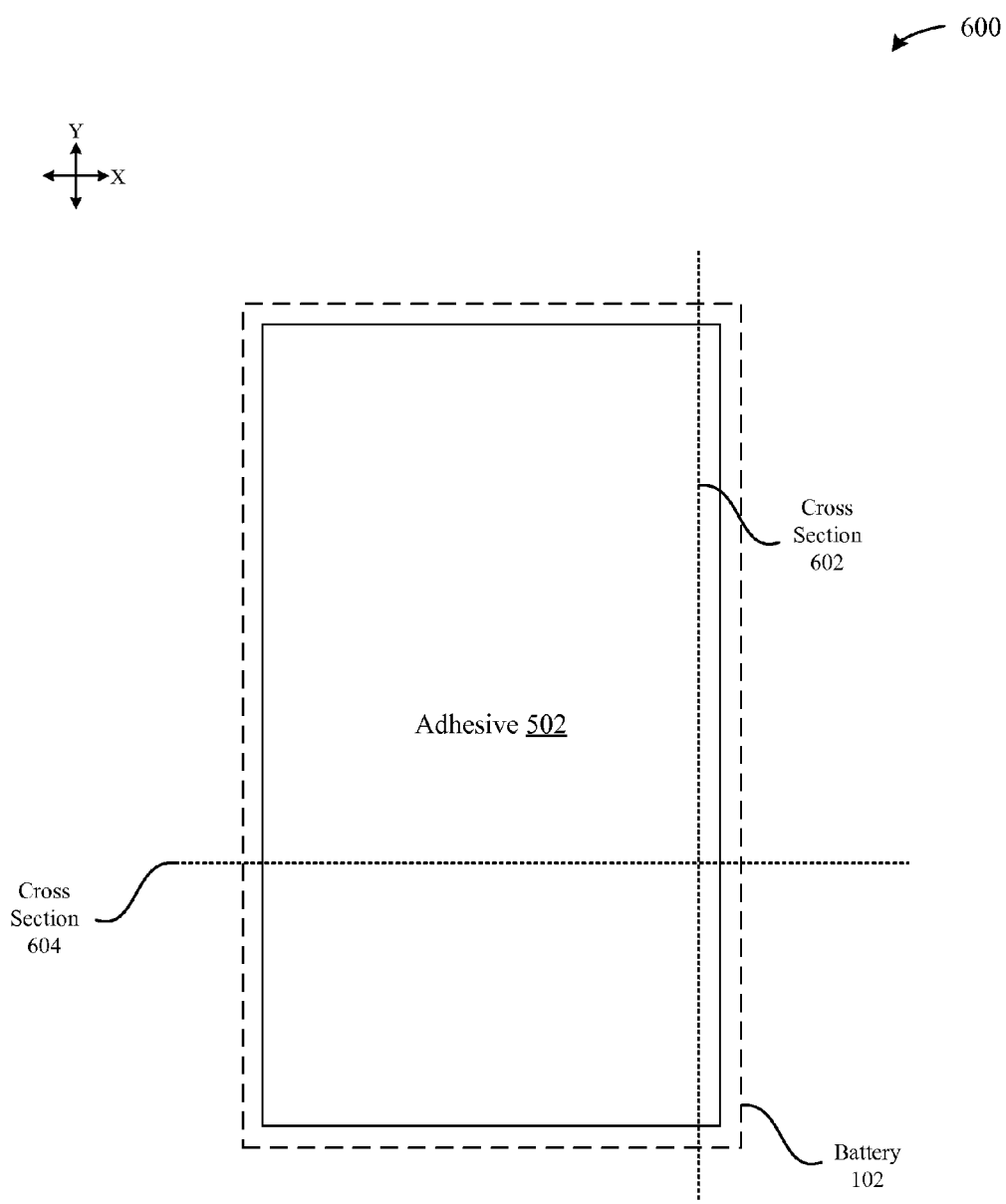

FIGS. 6A - 6B illustrate cross-sectional perspective views 600 and 625, respectively, of the pull string battery removal apparatus, according to one embodiment of the invention. More specifically, a cross section 602 and a cross section 604 are specified against a flattened perspective view of the pull string battery removal apparatus, and a detailed view is provided in FIG. 6B for each of the cross section 602 and the cross section 604.

As illustrated in FIG. 6B, the cross section 602 of the pull string battery removal apparatus includes the battery 102, the adhesive layers 502-1 and 502-1 that form the seam 503, the graspable portion of the pull string 504, and the casing 101. As shown in the cross section 602, the adhesive layers 502-1 and 502-2 are disposed between the battery 102 and the casing 101 such that the battery 102 is adhered to the casing 101 yet can be removed via the pull string 504 according to the techniques described below. Also illustrated in FIG. 2B is the cross section 204 of the pull string battery removal apparatus, which includes the battery 102, adhesive layers 502-1 and 502-2 that form the seam 503, the graspable portion of the pull string 504, and the casing 101. As with the cross section 602, the cross section 604 illustrates that the adhesive layers 502-1 and 502-2 are disposed between the battery 102 and the casing 101 such that the battery 102 is adhered to the casing 101 yet can be removed via the pull string 504 according to the techniques described below.

Figure 7A:
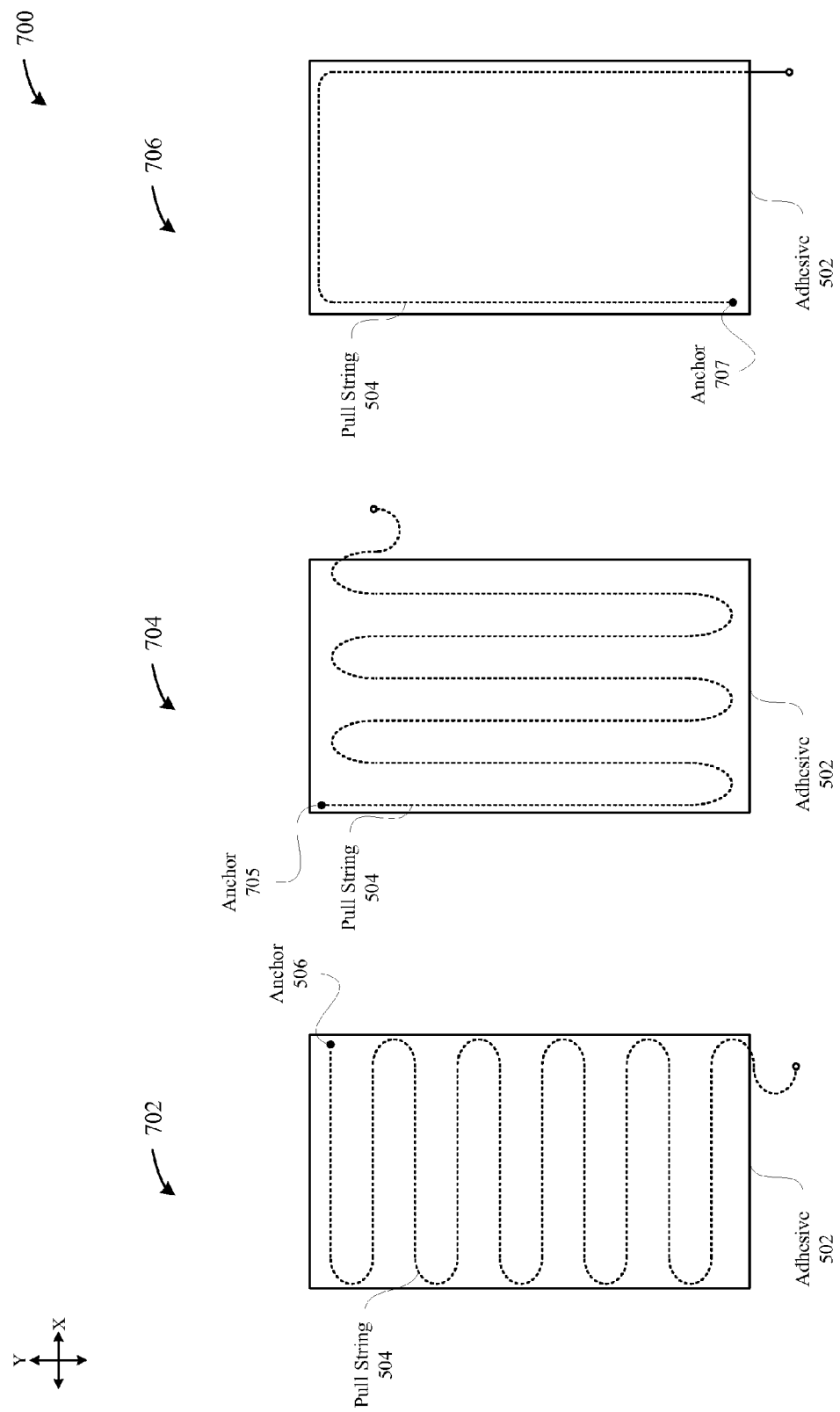
FIGS. 7A-7B illustrate various embodiments for different configurations of the pull string battery removal apparatus.

As noted above, the pull string 504 can be routed through the adhesive layer 502 according to a variety of techniques to enable a service technician to fully or partially separate the adhesive layer 502 at the seam 503. For example, FIG. 7A illustrates configurations 700 that illustrate different ways of routing the pull string 504 through the adhesive layer 502. In configurations 700 the pull string 504 can be made from a variety of materials that can include, but are not limited to, metal, carbon fiber, Kevlar, strong filaments, and the like. In this manner, the pull string 504 can possess an amount of strength that prevents it from tearing or snapping when a service technician pulls on the graspable portion of the pull string 504 and exerts force to separate the adhesive layer 502.

The configuration 702 illustrated in FIG. 7A reflects the manner in which the pull string 504 is routed according to FIGS. 5A-5B. In particular, the pull string 504 is anchored at anchor 506 and routed through the adhesive layer 502 in a top to bottom fashion such that the graspable portion of the pull string 504 exits near the bottom right of the adhesive layer 502. As noted above, however, alternative configurations—such as configurations 704 and 706—can be used to cause the adhesive layer 502 to fully or partially separate. For example, configuration 704 involves routing the pull string 504 through adhesive layer 502 in a left to right fashion such that the graspable portion of the pull string 504 exits near the top right of the adhesive layer 502. Also shown in configuration 704 is a new anchor 705 that is positioned to enable the pull string 504 to remain in place when the graspable portion of the pull string 504 is pulled on by a service technician. Notably, and advantageously, the configuration 704 can in some cases allow the pull string 504 to be shorter in length, thereby saving materials and decreasing the overall cost of producing the pull string battery removal apparatus. Those having ordinary skill in the art will also appreciate that in configurations 702 and 704 the pull string 504 can be a shorter length such that less turns are made overall. Such shorter lengths, however, increase the amount of adhesive that each section of the pull string 504 must tear through, which adds to the overall force that the pull string 504 must endure. In some cases, the length of the pull string 504 can correlate to the strength that the pull string 504 must possess such that a tradeoff can exist between the type of material used versus the length of material required. An example of this tradeoff is illustrated in configuration 706, where the pull string 504 is simply routed around three of four segments of the perimeter of the adhesive layer 502. In particular, the pull string 504 is anchored at an anchor 707 and exits at the bottom right area of the adhesive layer 502 such that when a service technician pulls on the graspable portion of the pull string 504 nearly all of the adhesive layer 502 is separated and the battery 102 can be removed from the portable computing device.

Figure 7B:
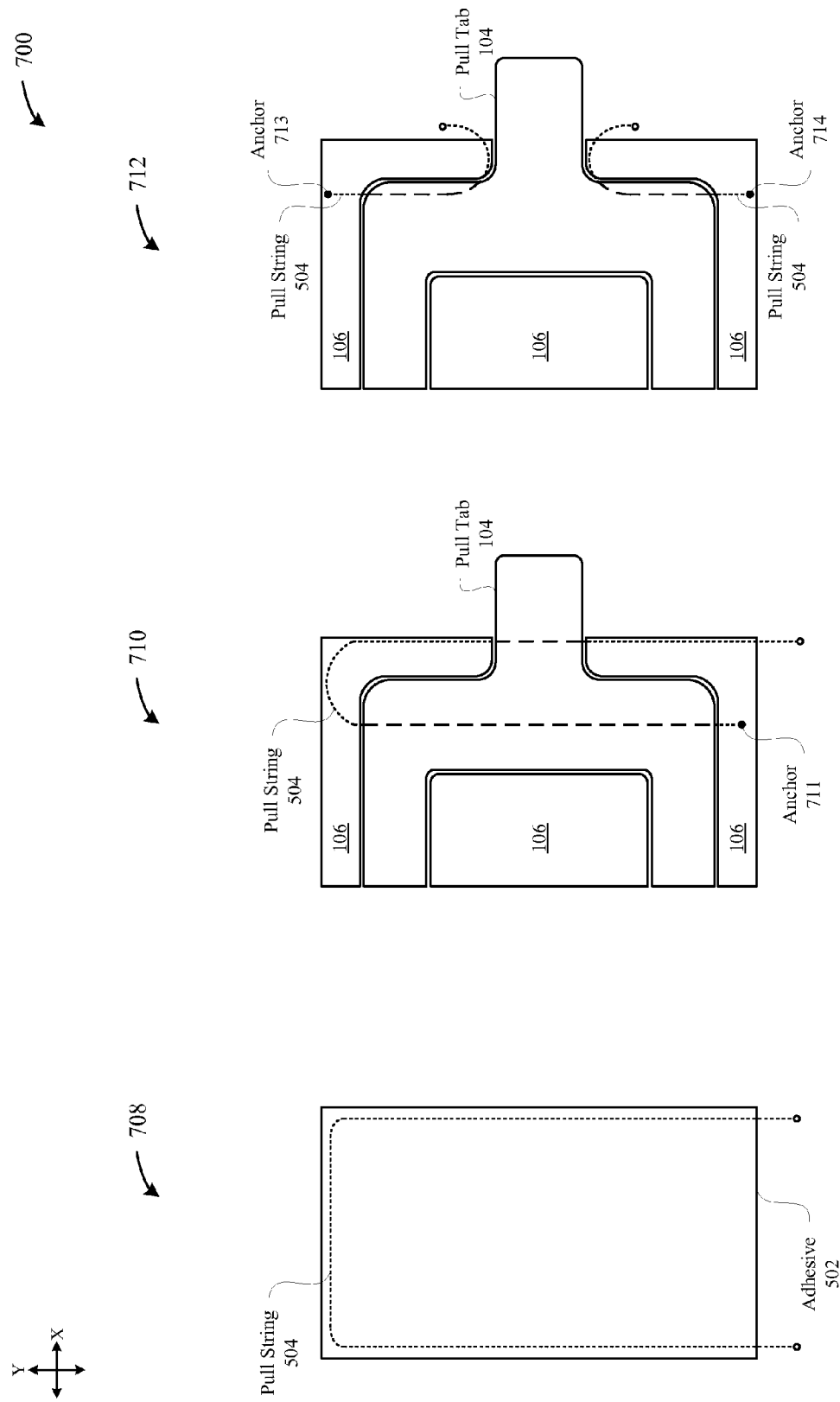

In some cases, an anchor may be undesirable since it can add to the overall complexity of manufacturing the pull string battery removal apparatus. Accordingly, configuration 708 in FIG. 7B illustrates an approach that does not involve anchoring the pull string 504 and instead involves having both ends of the pull string 504 protrude out from the adhesive layer 502 such that each end of the pull string 504 can be grasped and pulled on by a service technician to fully or partially separate the adhesive layer 502. The two ends of the pull string 504 can be used by the service technician according to a variety of approaches. In one approach, for example, the service technician can grasp a first end of the pull string 504 and hold it in place while grasping and pulling on a second end of the pull string 504 such that the first end of the pull string 504 acts as an anchor similar to configuration 706 without requiring that an anchor of some kind is provided within the pull string battery removal apparatus. In another approach, a service technician can hold the portable computing device in place and grasp both ends of the pull string 504 and pull on each end such that the pull string 504 separates the adhesive layer 502 in a top to bottom manner.

Additional configurations 710 and 712 are illustrated in FIG. 7B and are directed to a combined approach that utilizes both the pull string approach and the pull tab approach. In particular, the configuration 710 includes a pull tab battery removal apparatus similar to those described above in conjunction with FIGS. 1A-1C, 2A-2B, 3A-3B, and 4. In particular, in configuration 710, a stronger adhesive is used for the adhesive layers 106, and both the adhesive layers 106 and the pull tab 104 are thinned, but the pull tab 104 is not reinforced according to the techniques illustrated in FIGS. 3A-3B and 4 and described above. Instead, and as shown in configuration 710, a pull string 504 is secured at an anchor 711 and routed through the adhesive layers 106 to target the adhesive layers 106 near the critical area 130 shown in FIG. 1 C. According to this configuration, a service technician first pulls on the graspable portion of the pull string 504 to sever portions of the adhesive layers 106 that are near the critical area 130. Subsequently, the service technician uses the pull tab 104 to remove the battery 102 from the portable computing device. In this manner, the critical area 130 of the pull tab 104—which would normally tear when thinned and solely used in attempt to remove the battery 102 from the strengthened, thinned adhesive layers 106—undergoes less stress since a majority of the adhesive layers 106 that are applied near the critical area 130 are initially severed by the pull string 504.

Finally, the configuration 712 illustrates yet an additional configuration that utilizes both the pull string approaches and the pull tab approaches described herein. As with the configuration 710 described above, in the configuration 712, a stronger adhesive is used for the adhesive layers 106, and both the adhesive layers 106 and the pull tab 104 are thinned, but the pull tab 104 is not reinforced according to the techniques illustrated in FIGS. 3A-3B and 4 and described above. Instead, and as shown in configuration 712, a first pull string 504 secured at an anchor 713 is routed through a first portion of the adhesive layers 106 and a second pull string 504 secured at an anchor 714 is routed through a second portion of the adhesive layers 106. Thus, both areas of the adhesive layers 106 that lie near the critical area 130 are targeted by the first and second pull strings 504. According to this configuration, a service technician first pulls on the graspable portion of the first pull string 504 to sever the first portion of the adhesive layers 106, and then pulls on the graspable portion of the second pull string 504 to sever the second portion of the adhesive layers 106. Subsequently, the service technician uses the pull tab 104 to remove the battery 102 from the portable computing device. In this manner, the critical area 130 of the pull tab 104—which, again, would normally tear when thinned and solely used in attempt to remove the battery 102 from the strengthened, thinned adhesive layers 106—undergoes less stress since the portions of the adhesive layers 106 that are applied near the critical area 130 are initially severed by the pull strings 504.

Figure 8:
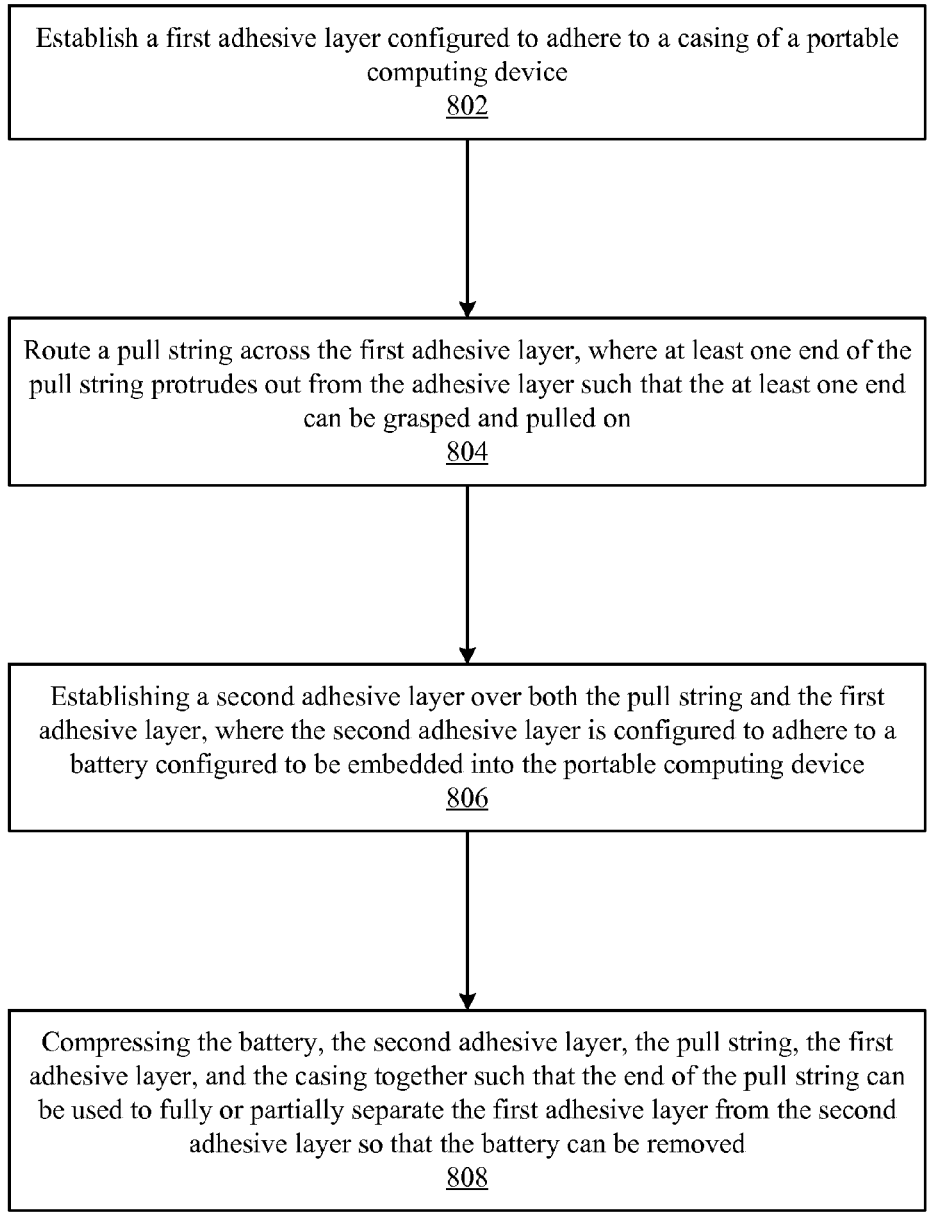
FIG. 8 illustrates a method for configuring the pull string battery removal apparatus, according to one embodiment of the invention.

FIG. 8 illustrates a method 800 for configuring a pull string battery removal apparatus, according to one embodiment of the invention. As shown, the method 800 begins at step 802, and involves establishing a first adhesive layer configured to adhere to a casing of a portable computing device. Step 804 involves routing a pull string across the first adhesive layer, where at least one end of the pull string protrudes out from the adhesive layer such that the at least one end can be grasped and pulled on by a service technician. Step 806, involves establishing a second adhesive layer over both the pull string and the first adhesive layer, where the second adhesive layer is configured to adhere to a battery configured to be embedded into the portable computing device. Step 808 involves compressing the battery, the second adhesive layer, the pull string, the first adhesive layer, and the casing together such that the end of the pull string can be used to fully or partially separate the first adhesive layer from the second adhesive layer so that the battery can be removed.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A battery removal apparatus for removing a battery from a portable computing device, the battery removal apparatus comprising:
    an adhesive layer that includes a seam defined by a first layer and a second layer, wherein the first layer is configured to adhere to a battery and the second layer is configured to adhere to a casing of the portable computing device; and
    a pull string that is routed through the seam according to a particular path such that when a first end of the pull string that protrudes out from the adhesive layer is pulled on, the pull string cuts through the adhesive layer and causes the first layer and the second layer to fully or partially separate from one another so that the battery can be removed from the casing.

2. The battery removal apparatus of claim 1, wherein a second end of the pull string is anchored such that the pull string, when pulled on, does not slip out and fail to separate the first layer from the second layer.

3. The battery removal apparatus of claim 2, wherein the second end of the pull string is anchored at an end of the adhesive layer opposite from where the first end protrudes out from the adhesive layer, and the path of the pull string traverses through the adhesive layer in a switchback pattern.

4. The battery removal apparatus of claim 2, wherein the second end of the pull string is anchored at a same side of the adhesive layer where the first end protrudes out from the adhesive layer, and the path of the pull string traverses three out of four sides of the adhesive layer.

5. The battery removal apparatus of claim 1, wherein a second end of the pull string also protrudes out from the adhesive layer, and is simultaneously pulled on along with the first end to further contribute to the full or partial separation of the first layer and the second layer.

6. The battery removal apparatus of claim 1, wherein the pull string is composed of metal, carbon fiber, Kevlar, or strong filaments.

7. A portable computing device, comprising:
    a casing;
    a battery; and
    a battery removal apparatus for removing the battery from the portable computing device, the battery removal apparatus comprising:
        an adhesive layer configured to be disposed between the battery and the casing, wherein the adhesive layer includes a first layer and a second layer that form a seam throughout the adhesive layer; and
        a pull string that is routed through the seam according to a particular path, wherein, when a first end of the pull string that protrudes out from the adhesive layer is pulled on, the pull string cuts through the adhesive layer and causes the first layer and the second layer to fully or partially separate from one another so that the battery can be removed from the casing.

8. The portable computing device of claim 7, wherein a second end of the pull string is anchored such that the pull string, when pulled on, does not slip out and fail to separate the first layer from the second layer.

* * * * *